United States Patent
Hung

(10) Patent No.: US 9,395,552 B2
(45) Date of Patent: Jul. 19, 2016

(54) BLUR CORRECTION DEVICE, AND LENS BARREL PROVIDED WITH BLUR CORRECTION DEVICE, AND CAMERA SYSTEM

(71) Applicant: Panasonic Intellectual Property Management Co., Ltd., Osaka (JP)

(72) Inventor: Shun Chieh Hung, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/630,284

(22) Filed: Feb. 24, 2015

(65) Prior Publication Data

US 2015/0248018 A1 Sep. 3, 2015

(30) Foreign Application Priority Data

Feb. 28, 2014 (JP) .................................. 2014-037869
Nov. 28, 2014 (JP) .................................. 2014-241581

(51) Int. Cl.
G02B 27/64 (2006.01)
G03B 17/12 (2006.01)
G02B 7/02 (2006.01)
G03B 5/02 (2006.01)

(52) U.S. Cl.
CPC .............. *G02B 27/646* (2013.01); *G02B 7/023* (2013.01); *G03B 5/02* (2013.01); *G03B 2205/0015* (2013.01)

(58) Field of Classification Search
CPC ...... G02B 27/646; G02B 7/023; G02B 17/12; G02B 2205/0007; G02B 2205/0015
See application file for complete search history.

(56) References Cited

U.S. PATENT DOCUMENTS

| 5,153,633 | A | * | 10/1992 | Otani | G02B 27/646 348/E5.046 |
| 5,398,132 | A | * | 3/1995 | Otani | G02B 27/646 348/E5.046 |
| 5,758,203 | A | * | 5/1998 | Konno | G03B 5/00 396/55 |
| 5,881,325 | A | | 3/1999 | Imura et al. | |
| 5,974,268 | A | * | 10/1999 | Washisu | G03B 5/00 396/55 |
| 6,052,240 | A | * | 4/2000 | Ikari | G02B 27/646 359/554 |
| 2001/0031141 | A1 | * | 10/2001 | Izukawa | G02B 27/646 396/55 |
| 2004/0057710 | A1 | * | 3/2004 | Terao | G02B 7/023 396/52 |

(Continued)

FOREIGN PATENT DOCUMENTS

JP 09-080561 A 3/1997
JP 2002-107784 A 4/2002

(Continued)

*Primary Examiner* — Frank Font
(74) *Attorney, Agent, or Firm* — McDermott Will & Emery LLP

(57) ABSTRACT

A blur correction device according to this disclosure includes: a movable frame which supports a correction optical system, the movable frame having a through hole formed along an optical axis; a base part which holds the movable frame; and a base frame which forms a space, where the movable frame moves, between the base frame and the base part; a guide shaft being disposed inside the through hole formed in the movable frame; a locking member which is movably supported by the guide shaft, the locking member being configured to move into the through hole formed in the movable frame to come into contact with a part of the movable frame for restricting movement of the movable frame in a direction intersecting the optical axis of the movable frame; and a drive unit which drives the locking member along the guide shaft.

10 Claims, 5 Drawing Sheets

(56) References Cited

U.S. PATENT DOCUMENTS

| | | | |
|---|---|---|---|
| 2004/0085639 A1* | 5/2004 | Katagishi | G02B 27/646 359/557 |
| 2006/0216009 A1* | 9/2006 | Kawamura | G02B 27/646 396/55 |
| 2013/0163973 A1* | 6/2013 | Tanaka | G03B 5/00 396/55 |
| 2014/0160566 A1* | 6/2014 | Shihoh | G03B 5/00 359/557 |

FOREIGN PATENT DOCUMENTS

| | | | |
|---|---|---|---|
| JP | 2004-205606 A | 7/2004 | |
| JP | EP 2708946 A2 * | 3/2014 | H04N 5/23287 |

* cited by examiner

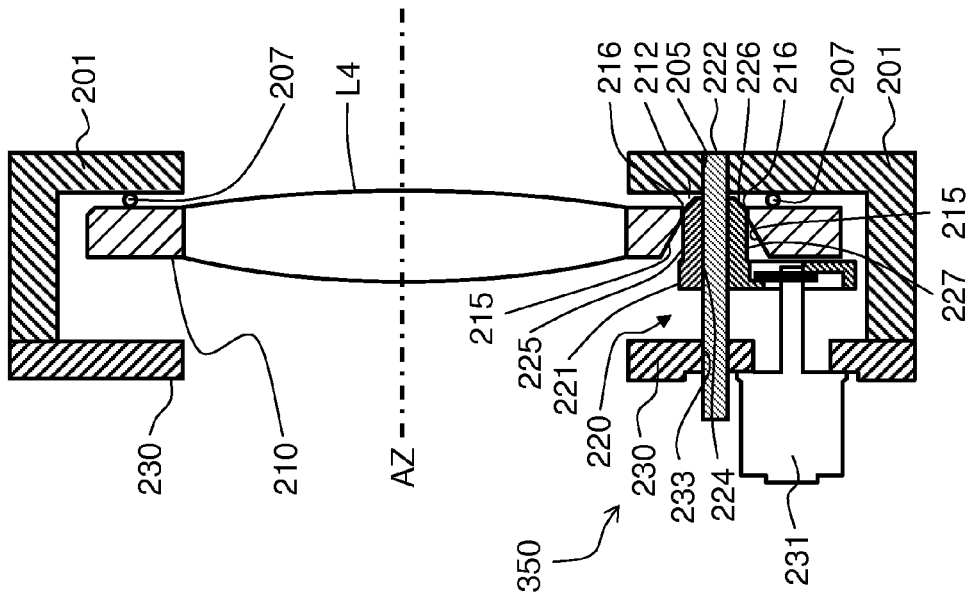
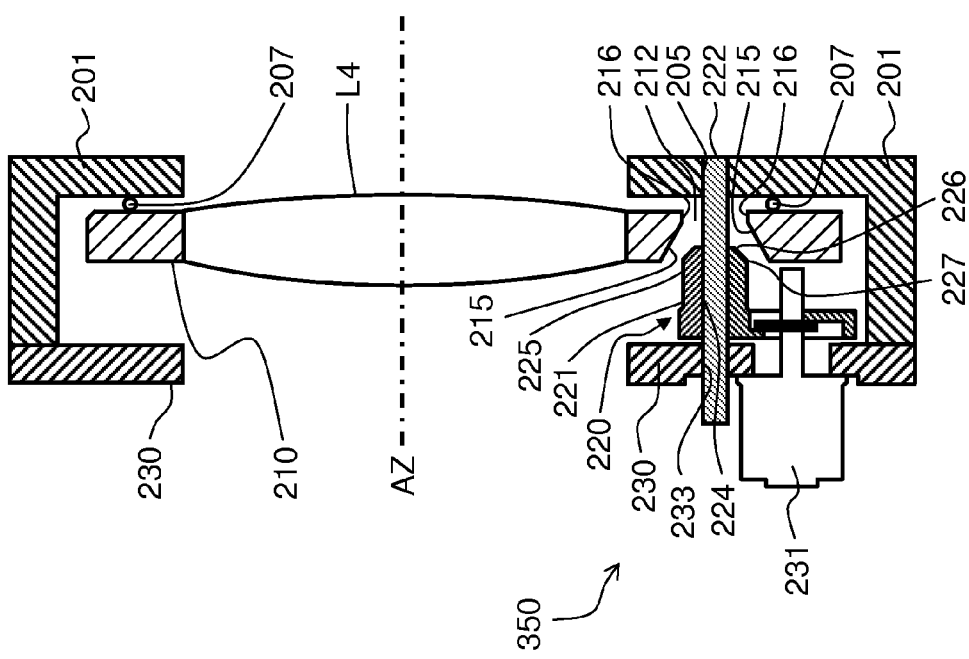

BLUR CORRECTION DEVICE, AND LENS BARREL PROVIDED WITH BLUR CORRECTION DEVICE, AND CAMERA SYSTEM

RELATED APPLICATIONS

This application claims the benefit of Japanese Application No. 2014-037869, filed on Feb. 28, 2014 and Japanese Application No. 2014-241581, filed on Nov. 28, 2014, the disclosures of which Applications are incorporated by reference herein.

BACKGROUND

1. Field

This disclosure relates to a blur correction device provided with a movable frame which holds a correction optical system, a lens barrel provided with the blur correction device, and a camera system.

2. Description of the Related Art

Unexamined Japanese Patent Publication 09-080561 discloses a device which mechanically fixes a blur correction optical system in a power OFF state or the like. That is, the device described in Unexamined Japanese Patent Publication 09-080561 includes: an image blur correction lens; a lens frame having a recess and supporting the lens; a latch solenoid; and a plunger. Due to such a configuration, in a state where a blur correction function is set invalid, for example, an image blur correction lens can be mechanically fixed.

SUMMARY

A blur correction device according to this disclosure includes: a movable frame which supports a correction optical system, and is movable in a direction perpendicular to an optical axis of the correction optical system, the movable frame having a through hole formed along the optical axis; a base part which holds the movable frame in a movable state; and a base frame which has a facing surface disposed to face the base part, and forms a space, where the movable frame moves, between the base frame and the base part. The blur correction device according to this disclosure also includes: a guide shaft which has one end side supported on the base part and another end side supported on the base frame, the guide shaft being disposed inside the through hole formed in the movable frame; a locking member which is movably supported by the guide shaft, the locking member being configured to move into the through hole formed in the movable frame to come into contact with a part of the movable frame for restricting movement of the movable frame in a direction intersecting the optical axis of the movable frame; and a drive unit which drives the locking member along the guide shaft.

BRIEF DESCRIPTION OF DRAWINGS

FIG. 4A is a cross-sectional view of the OIS locking mechanism of the blur correction device according to the first exemplary embodiment.

FIG. 4B is a cross-sectional view of the OIS locking mechanism of the blur correction device according to the first exemplary embodiment.

DETAILED DESCRIPTION

Hereinafter, exemplary embodiments are described in detail with reference to the drawings as necessary. However, the detailed description more than necessary may be omitted. For example, the detailed description of matters which are already well-known or the repeated description of the substantially identical configuration may be omitted. Such omission can prevent the description made hereinafter from becoming unnecessarily redundant thus facilitating the understanding of this disclosure by those skilled in the art.

The present inventors provide the accompanying drawings and the following descriptions to allow those skilled in the art to sufficiently understand the present disclosure, and the subject matter defined in the claims is not intended to be restricted by the drawings and the descriptions.

First Exemplary Embodiment

Hereinafter, lens barrel 20 on which a blur correction device according to a first exemplary embodiment is mounted, and digital camera (camera system) 1 are described with reference to FIG. 1 to FIG. 5.

[1-1. Configuration]

[1-1-1. Configuration of Digital Camera 1]

Figure 1:
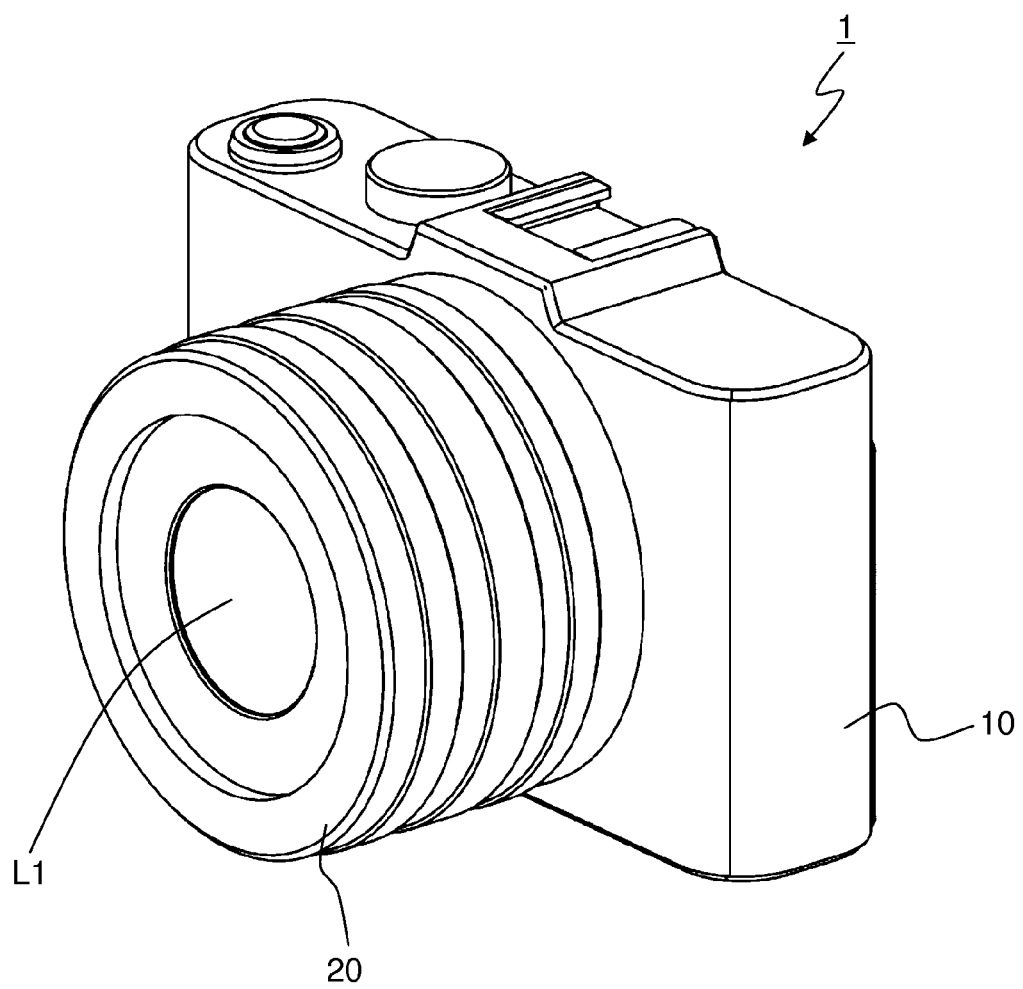
FIG. 1 is an overall perspective view showing a digital camera including a lens barrel on which a blur correction device according to a first exemplary embodiment is mounted.
Figure 2:
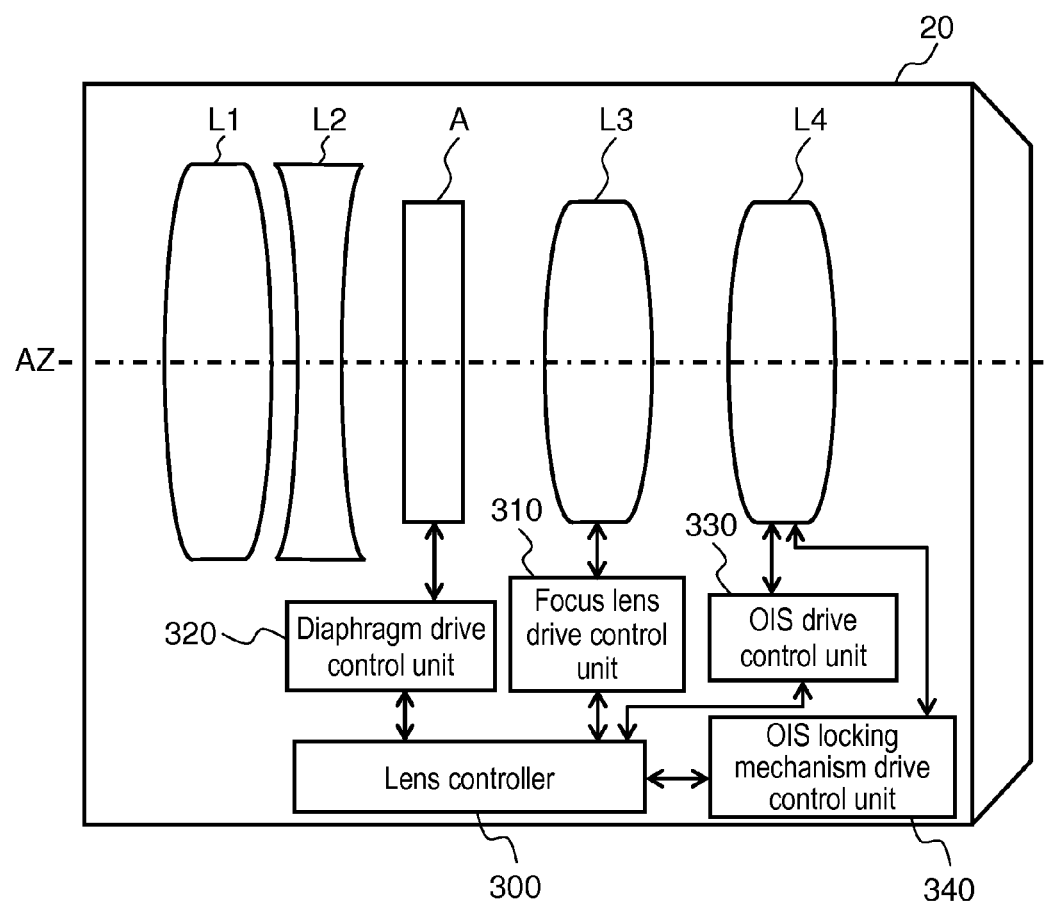
FIG. 2 is a schematic configuration view of the lens barrel of the digital camera shown in FIG. 1.
Figure 3:
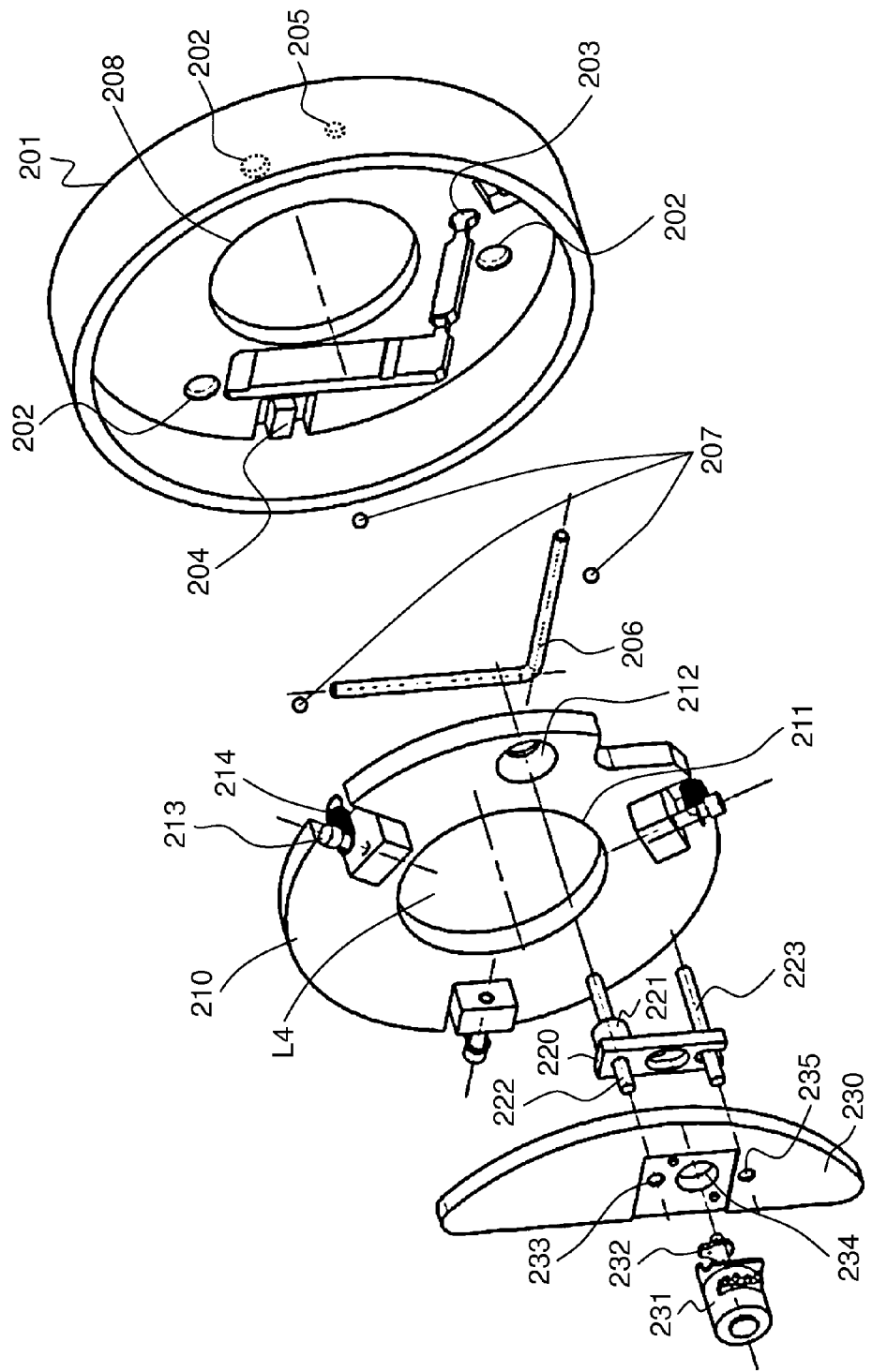
FIG. 3 is an exploded perspective view showing an OIS locking mechanism of the blur correction device mounted on the lens barrel shown in FIG. 1.
Figure 5:
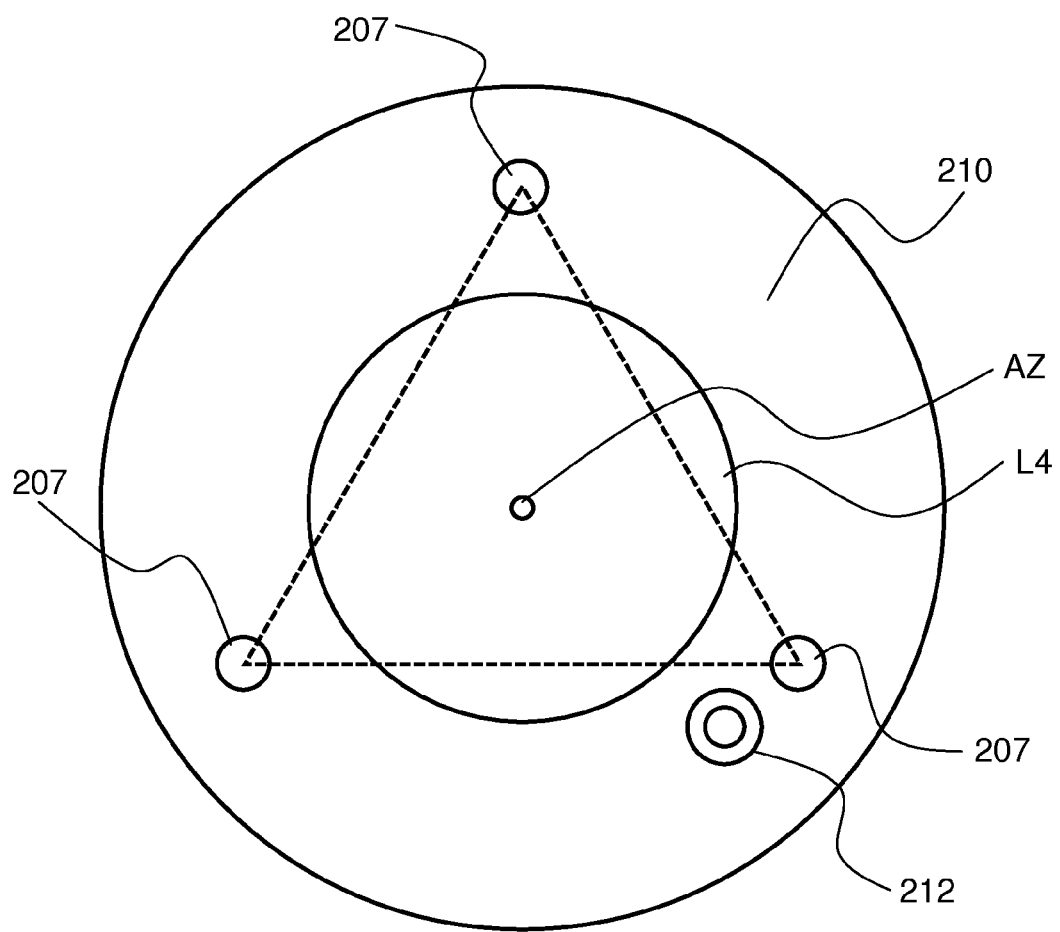
FIG. 5 is an explanatory view showing a relationship between a lens frame included in the OIS locking mechanism of the blur correction device shown in FIG. 3 and a lock position.

FIG. 1 is a view showing a configuration of digital camera 1 according to the first exemplary embodiment. FIG. 2 is a schematic configuration view of a lens barrel according to the first exemplary embodiment. FIG. 3 is a configuration view of OIS (Optical Image Stabilizer) locking mechanism 350 included in a blur correction device according to the first exemplary embodiment. FIG. 4 is a cross-sectional configuration view of OIS locking mechanism 350 included in the blur correction device according to the first exemplary embodiment. FIG. 5 is a view for describing a lens frame of OIS locking mechanism 350 included in the blur correction device according to the first exemplary embodiment and a lock position.

As shown in FIG. 1, digital camera 1 includes: camera body 10; and lens barrel 20 which is mounted on a mount part (not shown) of camera body 10.

As shown in FIG. 2, lens barrel 20 includes therein: first lens group L1; second lens group L2; diaphragm A; focus lens group L3; and OIS lens group (correction optical system) L4.

Lens barrel 20 also includes a blur correction device which is configured by: lens controller 300; focus lens drive control unit 310; diaphragm drive control unit 320; OIS drive control unit 330; and OIS locking mechanism drive control unit 340.

Lens controller 300 receives an instruction from camera body 10. Lens controller 300 controls the operation of the lens barrel in accordance with information from the above various control units.

Focus lens drive control unit 310 drives a focus-lens holding mechanism in the optical axis direction when a user performs focusing by overlapping a subject with a focus point at the time of photographing.

Diaphragm drive control unit 320 controls a mechanism which includes diaphragm A disposed inside lens barrel 20.

The blur correction device is a device for correcting shaking of digital camera 1 occurring at the time of photographing. The blur correction device includes: OIS drive control unit 330; OIS locking mechanism drive control unit 340; and OIS locking mechanism 350 (not shown in FIG. 2) for fixing OIS lens group L4.

OIS drive control unit 330 controls the driving of OIS lens group L4 with respect to shaking of digital camera 1 which occurs at the time of photographing within a specific movable range in the direction orthogonal to an optical axis.

OIS locking mechanism drive control unit 340 controls the driving of OIS locking mechanism 350 so as to fix or release the fixing of OIS lens group L4 when an OIS function is turned off/on.

OIS locking mechanism 350 restricts the movement of OIS lens group L4 in a plane perpendicular to the optical axis in a state where the OIS function is in an OFF state (in a state where a power source is in an OFF state, for example). The detailed configuration of OIS locking mechanism 350 is described later.

[1-1-2. Configuration of OIS Locking Mechanism]

The detailed configuration of OIS locking mechanism 350 is described with reference to FIG. 3, FIG. 4A and FIG. 4B.

As shown in FIG. 3, OIS locking mechanism 350 includes: fixed frame 201 as a base part; lens frame 210 as a movable frame; locking member 220; and motor fixing frame 230 as a base frame.

As shown in FIG. 3, fixed frame 201 is an approximately cylindrical member having opening 208. Fixed frame 201 holds lens frame 210 on an inner peripheral surface side thereof.

Fixed frame 201 includes: bearing ball receiving portions 202; OIS guide shaft receiving groove 203; hook 204; and first guide shaft support hole 205.

Lens frame 210 has lens chamber 211. OIS lens group L4 is held in lens chamber 211. Examples of a method of driving OIS lens group L4 include driving using a magnetic circuit (not shown) and driving using an actuator such as a stepping motor.

As shown in FIG. 3, lens frame 210 is a doughnut-shaped disc member having a through hole at a center portion. Lens frame 210 is disposed in a movable manner in a gap formed between fixed frame 201 and motor fixing frame 230. That is, lens frame 210 is disposed in the gap formed between a surface of fixed frame 201 and a surface of motor fixing frame 230 which face each other, and is movable in the direction perpendicular to optical axis AZ.

Lens frame 210 includes: OIS lens chamber 211 formed by a through hole; through hole 212; spring fixing screws 213; and springs 214.

As shown in FIG. 4A, bearing ball receiving portions 202 formed on a fixed frame 201 side support bearing balls 207. Due to such a configuration, lens frame 210 is slidably supported on fixed frame 201 by way of bearing balls 207.

As shown in FIG. 3, OIS guide shaft 206 is a rod-shaped member which is bent at an approximately right angle. OIS guide shaft 206 moves lens frame 210 relative to fixed frame 201 in two directions which are orthogonal to optical axis AZ. Further, OIS guide shaft 206 is supported by OIS guide shaft receiving groove 203 formed on a fixed frame 201 side, and an OIS guide shaft receiving groove (not shown) formed on a lens frame 210 side.

One end side of spring 214 is connected to spring fixing screw 213 of lens frame 210 and the other end of spring 214 is connected to hook 204 formed on a fixed frame 201 side. Spring 214 is disposed such that a cylindrical axis of spring 214 extends along the direction of optical axis AZ. Springs 214 bias lens frame 210 to fixed frame 201 in the direction of optical axis AZ.

It is sufficient that spring fixing screw 213 is a fixing jig having a shape which allows spring fixing screw 213 to be connected to spring 214. Accordingly, a spring fixing member is not limited to a screw.

OIS locking mechanism 350 includes: locking member 220 having projection 221; guide shaft 222; and auxiliary lock guide shaft 223.

Motor fixing frame 230 is disposed such that lens frame 210 is sandwiched between motor fixing frame 230 and a surface of fixed frame 201 orthogonal to optical axis AZ. Motor fixing frame 230 has second guide shaft support hole 233 into which a second end side of guide shaft 222 is inserted. Stepping motor 231 as a drive unit is fixed to a surface of motor fixing frame 230 which is on a side opposite to the surface of motor fixing frame 230 facing lens frame 210. Stepping motor 231 includes nut 232. Nut 232 passes through motor hole 234 and projects toward a locking member 220 side. Motor fixing frame 230 also has auxiliary guide shaft receiving hole 235 into which the other end of auxiliary lock guide shaft 223 is inserted.

With respect to projection 221 of locking member 220, as shown in FIG. 4A and FIG. 4B, a distal end portion of projection 221 on a through hole 212 side is formed in a tapered shape having a center axis parallel to the direction of optical axis AZ. More specifically, projection 221 has, on the distal end on the through hole 212 side, first surface 225 formed approximately parallel to optical axis AZ and first inclined surface 226 formed in an inclined manner with respect to first surface 225. In a through hole into which guide shaft 222 is inserted, projection 221 has sliding surface 224 which is brought into contact with an outer peripheral surface of guide shaft 222.

Projection 221 is fitted in through hole 212 formed in lens frame 210 thus fixing lens frame 210 to motor fixing frame 230.

Guide shaft 222 is disposed so as to penetrate projection 221 formed on locking member 220 and locking member 220.

In this exemplary embodiment, auxiliary lock guide shaft 223 is disposed so as to penetrate locking member 220. However, auxiliary lock guide shaft 223 is not always an essential constituent. However, in view of stabilizing a sliding operation of locking member 220, it is preferable that auxiliary lock guide shaft 223 be provided.

As shown in FIG. 4, guide shaft 222 is disposed along the direction approximately parallel to optical axis AZ. One end side of guide shaft 222 is supported by being inserted into first guide shaft support hole 205 formed on a fixed frame 201 side, and the other end side of guide shaft 222 is supported by being inserted into second guide shaft support hole 233 formed on a motor fixing frame 230 side.

Locking member 220 is slidable along guide shaft 222 upon receiving a rotational driving force of stepping motor 231. In more detail, locking member 220 is connected to a rotation shaft of stepping motor 231. Along with the rotation of stepping motor 231 in a normal direction or in a reverse direction, locking member 220 is moved in a longitudinal direction along guide shaft 222.

[1-1-3. Setting Position of OIS Locking Mechanism 350]

A setting position of OIS locking mechanism 350 is described hereinafter with reference to FIG. 5.

Lens frame 210 is biased to fixed frame 201 by springs 214 such that the same distance is always maintained between lens frame 210 and fixed frame 201 in the direction of optical axis AZ.

For example, when OIS locking mechanism 350 is shifted to an ON state such as when a power source of digital camera 1 is brought into an OFF state or the like, projection 221 is moved to a fixed frame 201 side in the direction of optical axis AZ, and engages with lens frame 210 by fitting engagement.

In this exemplary embodiment, it is desirable that through hole 212 be formed within a region surrounded by a plurality of bearing balls 207 which support lens frame 210. However, as shown in FIG. 5, most part of a region surrounded by bearing balls 207 (a region having a triangular shape in this exemplary embodiment) is usually occupied by OIS lens group L4. Accordingly, in an actual device, it is difficult to design such that through holes 212 are located within the region formed by bearing balls 207.

In view of the above, in this exemplary embodiment, through holes 212 are located at positions in the vicinity of the region surrounded by the plurality of bearing balls 207 as much as possible. Accordingly, it is possible to suppress, to a minimum level, the inclination of lens frame 210 when OIS locking mechanism 350 is in an ON state.

[1-2. Operation]

An operation of OIS locking mechanism 350 included in the blur correction device of this exemplary embodiment is described hereinafter with reference to FIG. 4A and FIG. 4B. FIG. 4A is a view showing a state where OIS locking mechanism 350 is operated (non-fixed state), and FIG. 4B is a view showing a state where OIS locking mechanism 350 is not operated (fixed state).

OIS locking mechanism 350 is driven such that stepping motor 231 is driven under a PWM (pulse width modification) control so as to drive locking member 220.

As shown in FIG. 4A, when an OIS function (blur correction function) of lens barrel 20 is in an ON state, lens frame 210 which holds OIS lens group L4 is movable in a plane perpendicular to optical axis AZ. Accordingly, locking member 220 does not restrict the movement of lens frame 210 and, as shown in FIG. 4A, locking member 220 is located at a position away from lens frame 210 in the direction of optical axis AZ.

More specifically, when the OIS function (blur correction function) is in an ON state, as shown in FIG. 4A, locking member 220 is not inserted into through hole 212 formed in lens frame 210, and only guide shaft 222 is inserted into through hole 212 formed in lens frame 210.

At this time, since an outer profile of a cylindrical portion of guide shaft 222 is far smaller than an outer profile of a cylindrical portion of locking member 220, when the blur correction function is in an ON state, guide shaft 222 does not restrict the movement of lens frame 210 in a plane perpendicular to optical axis AZ.

That is, lens frame 210 is movable in a plane perpendicular to the direction of optical axis AZ with a gap formed between an outer peripheral surface of guide shaft 222 and through hole 212 as a maximum movable range.

Accordingly, even when lens barrel 20 has the configuration in which guide shaft 222 is always inserted into through hole 212, lens barrel 20 can maintain a blur correction function.

On the other hand, when an OIS function of lens barrel 20 is in an OFF state (when a blur correction function is in an OFF state), it is necessary to fix lens frame 210 in a state where a center axis of OIS lens group L4 substantially agrees with optical axis AZ.

For this end, locking member 220 is driven upon receiving a rotation driving force of stepping motor 231 and fixes lens frame 210 thus preventing lens frame 210 from moving in a plane perpendicular to the direction of optical axis AZ.

At this time, locking member 220 slides to a fixed frame 201 side along guide shaft 222 so that edge 227 between first surface 225 and first inclined surface 226 is brought into contact with second inclined surface 215 of through hole 212.

Thereafter, when locking member 220 is further driven, lens frame 210 is fixed at a predetermined fixing position set in accordance with a shape of second inclined surface 215. After lens frame 210 is moved to the fixing position, second surface 216 as an inner peripheral surface of through hole 212 and first surface 225 as an outer peripheral surface of projection 221 are brought into contact with each other so that lens frame 210 is fixed.

Accordingly, even when a vibration, an impact, or the like is applied to digital camera 1 from outside in a state where a power source of digital camera 1 is in an OFF state, the movement of lens frame 210 in the direction intersecting optical axis AZ can be restricted.

Accordingly, even when a vibration, an impact, or the like is applied to digital camera 1, lens frame 210 moves within a movable range for blur correction, and hence it is possible to prevent the occurrence of problems such as breaking of a component.

To make the OIS function of the blur correction device operable again, locking member 220 is moved along guide shaft 222 in the direction where locking member 220 retracts from the inside of through hole 212. When locking member 220 retracts to a position where locking member 220 does not restrict the movement of lens frame 210 in a plane direction perpendicular to optical axis AZ and stops at such a position, the OIS function (blur correction function) of the blur correction device is brought into an ON state.

[1-3. Advantageous Effects and the Like]

As described above, according to the blur correction device disclosed in this exemplary embodiment, when the OIS function (blur correction function) is brought into an OFF state, that is, when the locking mechanism is brought into an ON state by OIS locking mechanism 350, locking member 220 is driven by stepping motor 231. Then, locking member 220 is stopped in a state where locking member 220 is inserted into through hole 212 formed in lens frame 210.

Due to such an operation, lens frame 210 is fixed in a state where the movement of lens frame 210 in a plane direction perpendicular to optical axis AZ is restricted at a position where a center axis of lens frame 210 substantially agrees with optical axis AZ.

Accordingly, for example, when a power source of digital camera 1 is in an OFF state, lens frame 210 becomes immovable in a plane direction perpendicular to optical axis AZ, so that digital camera 1 is brought into a state where the OIS function (blur correction function) does not function.

As a result, when the OIS function (blur correction function) is unnecessary, the movement of lens frame 210 can be restricted. Accordingly, even when an impact, a vibration, or the like is applied to digital camera 1 from the outside, it is possible to prevent the occurrence of problems such as breaking of a component while holding lens frame 210 in a stable state.

Further, in this exemplary embodiment, as shown in FIG. 5, through hole 212 is located in the vicinity of bearing ball 207.

Due to such arrangement, even when OIS locking mechanism 350 is brought into an ON state, it is possible to minimize a torque generated about a line which connects two bearing balls 207 disposed closest from a position of through hole 212 as an axis of rotation. As a result, a locking operation can be realized in a stable manner.

Further, OIS locking mechanism 350 includes projection 221 which is slidably mounted on guide shaft 222. Guide shaft 222 is supported by two points, that is, first guide shaft support hole 205 formed in fixed frame 201 and second guide shaft support hole 233 formed in motor fixing frame 230.

Due to such a configuration, compared to the conventional configuration in which a lock state and a lock release state are changed over by inserting or removing a cantilever locking pin, rigidity of the locking mechanism can be enhanced, and the strength of the locking mechanism can be ensured even when an impact or a vibration is applied from the outside.

Compared to the conventional configuration which uses the cantilever locking pin, in this embodiment, a phenomenon in which a distal end of the lock pin swings does not occur. Accordingly, a locking operation can be realized in a stable manner by reducing a friction force generated between edge 227 and first inclined surface 215.

Further, locking member 220 can ensure a large length of sliding surface 224 with respect to guide shaft 222, and hence locking member 220 can easily maintain the parallelism with optical axis AZ.

Other Exemplary Embodiments

The first exemplary embodiment has been described heretofore as an example of the technique disclosed by this disclosure. However, the technique according to this disclosure is not limited to the above, and is also applicable to embodiments to which changes, replacements, additions, omissions and the like are made. Further, it is possible to provide a new exemplary embodiment by combining respective constituents described in the above-mentioned first exemplary embodiment.

Hereinafter, other exemplary embodiments are exemplified.

Although one exemplary embodiment of the present disclosure has been described heretofore, the present disclosure is not limited to the above-mentioned exemplary embodiment, and various modifications can be made without departing from the gist of the disclosure.

(A)

In the above-mentioned exemplary embodiment, the description has been made by taking as an example the configuration in which both ends of guide shaft 222 are supported by fixed frame 201 as the base part and motor fixing frame 230 as the base frame, respectively. However, the present disclosure is not limited thereto.

For example, fixed frame 201 and motor fixing frame 230 in the above-mentioned exemplary embodiment may be formed into an integral body.

(B)

In the above-mentioned exemplary embodiment, the description has been made with respect to the example in which the OIS function is locked by moving approximately cylindrical locking member 220 having the tapered distal end along guide shaft 222, and by inserting locking member 220 into through hole 212. However, the present disclosure is not limited thereto, and a spherical surface may be formed on the distal end of locking member 220.

For example, the shape of the locking member inserted into the through hole is not limited to a circular cylindrical shape having a tapered distal end, and other shapes may be adopted.

In the same manner, the shape of the through hole into which the locking member is inserted is not limited to the tapered shape of the above-mentioned exemplary embodiment, and can be suitably changed in conformity with the shape of the locking member.

(C)

In the above-mentioned exemplary embodiment, the description has been made by taking as an example the configuration in which the blur correction device according to this disclosure is mounted on lens barrel 20 of digital camera 1. However, the present disclosure is not limited thereto.

For example, the configuration of this disclosure is also applicable to a blur correction device of a movie camera for photographing a moving image or an imaging device of a smart phone or the like in addition to the digital camera.

Further, the configuration of this disclosure is also applicable to a blur correction device mounted inside a compact digital camera in which the camera is integrally formed with a lens in addition to a lens interchangeable digital camera described in the above-mentioned exemplary embodiment.

What is claimed is:

1. A blur correction device comprising:
a movable frame which supports a correction optical system, and is movable in a direction perpendicular to an optical axis of the correction optical system, the movable frame having a through hole formed along the optical axis;
a base part which holds the movable frame in a movable state;
a base frame which has a facing surface disposed to face the base part, and forms a space, where the movable frame moves, between the base frame and the base part;
a guide shaft which has one end side supported on the base part and another end side supported on the base frame, the guide shaft being disposed inside the through hole formed in the movable frame;
a locking member which is movably supported by the guide shaft, the locking member being configured to move into the through hole formed in the movable frame to come into contact with a part of the movable frame for restricting movement of the movable frame in a direction intersecting the optical axis of the movable frame; and
a drive unit which drives the locking member along the guide shaft.

2. The blur correction device according to claim 1, wherein the base frame supports a second end portion side of the guide shaft at a portion which is disposed to face the base part, and holds the drive unit on a surface on a side opposite to the base part.

3. The blur correction device according to claim 1, wherein the guide shaft is disposed along a direction approximately parallel to the optical axis.

4. The blur correction device according to claim 1, wherein the through hole is formed in a tapered shape having a center axis disposed along an optical axis direction.

5. The blur correction device according to claim 1, wherein the locking member is formed in a tapered shape having a center axis disposed along an optical axis direction.

6. The blur correction device according to claim 1, further comprising a ball bearing disposed between the movable frame and the base part,
wherein the movable frame is supported on the base part by way of the ball bearing.

7. The blur correction device according to claim 6, wherein the through hole is located approximately in a vicinity of the ball bearing as viewed from an optical axis direction.

8. The blur correction device according to claim 1, wherein the drive unit is a stepping motor.

9. A lens barrel comprising:
the blur correction device according to claim 1; and
a correction optical system held by the movable frame included in the blur correction device.

10. A camera system comprising:
the lens barrel according to claim 9; and
a mount part on which the lens barrel is mounted.

* * * * *